Patented June 24, 1941

2,246,915

UNITED STATES PATENT OFFICE 2,246,915

POLYVINYL ALCOHOL COMPOSITION

Charles Dangelmajer, Nutley, N. J., assignor to Resistoflex Corporation, Belleville, N. J., a corporation of New York No Drawing. Application February 1, 1940, Serial No. 316,771

10 Claims. (Cl. 260—90)

This invention relates to plastic compositions, and more particularly to compositions comprising polyvinyl alcohol and modifying agents which render the compositions normally flexible. The compositions of the present invention are an improvement over known compositions with respect to their flexibility at elevated and low temperatures.

Plastic polyvinyl alcohol compositions are suitable for the making of flexible tubes, hose, gaskets, washers, diaphragms, films, sheets, filaments, coatings and the like. They are particularly suitable for use in the handling of hydrocarbon fuels, oils and many organic solvents, by which they are unaffected.

It is particularly desirable that articles made of such compositions shall retain their desirable flexibility throughout a wide temperature range. Heretofore normally flexible articles of plastic polyvinyl alcohol compositions have hardened or become brittle when subjected to extreme cold or to elevated temperatures for extended periods of time. For example, a flexible tubing used to convey oil which reaches a temperature range of from 115° to 125° C. becomes brittle in the course of about five days. It will also become brittle if subjected to a temperature of —36° or —37° C.

The object of the present invention is to improve the physical properties of compositions of the type described and particularly to increase their ability to withstand high and low temperatures without losing their flexibility.

In accordance with the invention it has been discovered that the incorporation in polyvinyl alcohol compositions of certain haloids greatly increases their stability and increases the duration of their flexibility at elevated temperatures while, at the same time, lowering the temperature at which the composition hardens. In general it has been found that the water soluble haloids of ammonium, of the alkali metals, or of the alkaline earth metals have this effect. Ammonium bromide and ammonium chloride are especially effective. The soluble chlorides, bromides and iodides of alkali metals, such as sodium and potassium, or of alkaline earth metals, such as calcium, barium and magnesium, and the soluble fluorides or bifluorides of ammonium, sodium or potassium are also suitable, although the beneficial effects may vary to some extent in accordance with the particular haloid used. Mixtures of these different haloids may also be used.

The effectiveness of the aforementioned haloids with different polyvinyl alcohol compositions has been experimentally established and they have been found to be generally useful for increasing the duration of flexibility of such compositions at elevated temperatures and for enabling them to remain flexible at lower temperatures. This effect is referred to herein as "thermostabilizing" and the means for effecting it as "thermostabilizing agents." Insoluble haloids fail to affect the influence of high and low temperatures because they act merely as inert fillers.

As is already known, flexible articles of various forms may be made, by molding, extruding, dipping and other procedures, from plasticized compositions of polyvinyl alcohol. Such compositions may also contain filling, coloring and other modifying ingredients, if desired. The term "polyvinyl alcohol" is used herein and in the claims to designate not only generically pure polyvinyl alcohol, which may be obtained in various modifications, but also such partial derivatives thereof as contain a sufficient number of unsubstituted hydroxyl groups as to render the compound soluble in water. For a fuller explanation, see Patent No. 2,111,272 of Paul M. Paulson, issued March 15, 1938. The polyvinyl alcohol used in the following examples was one of medium saponification number. It is preferred to use polyvinyl alcohols which are not completely saponified and it has been observed that the effectiveness of the haloids tends to increase as the saponification number increases.

The examples given below contain novel combinations of ingredients, apart from the haloids referred to, which are not claimed herein as they are the subject matter of my copending application Serial No. 346,150.

According to the present invention, polyvinyl alcohol is mixed with water, plasticizers, the haloid or haloids, and other ingredients, if any, to provide a material suitable for working up into finished articles by any desired process. In the examples, the formulae give mixes suitable for use in accordance with the process described in Schnabel Patent No. 2,177,612. After mixing, the ingredients are passed through rolls to form the material into strips. The temperature of the rolls may be varied within wide limits (15°–90° C.) depending upon the water content, the nature of the polyvinyl alcohol, the thickness of the strips, and on the ingredients of the composition. The strips may then be converted into tubing by extrusion or molded into sheets of any desired thickness.

The proportion of haloid to be used depends upon the particular haloid or haloids employed and the composition of the plastic mixture in which it is incorporated. It has been found that from 3% to 15%, calculated on the weight of the polyvinyl alcohol, is a suitable amount. The upper limit, which may be above 15%, is determined by the necessity of preserving the plasticity of the composition. The preferred range for ammonium chloride and ammonium bromide is from 6% to 12%. The range for the alkali metal and alkaline earth metal haloids is narrower but the proper quantity may readily be determined by preliminary test. In general, as the amount of haloid is increased the range of temperatures throughout which the composition will remain flexible is extended.

A slight crystallization of some of the haloids in the finished product may be observed at elevated temperatures or even at room temperature. It becomes apparent through a reduction in the transparency of the material. To reduce this tendency, monoethanol amine, diethanolamine, other amino compounds or compounds of a similar nature may be added to keep the material alkaline and retard crystallization. It has been found that crystallization proceeds more rapidly if the material is acid. It has been noted, however, that the slight crystallization of some of the haloids does not have any serious detrimental effect on the physical properties of the material or its behavior at various temperatures.

To enable those skilled in the art to understand and practice the invention a number of typical examples of the use of haloids in various polyvinyl alcohol compositions will not be described.

Example 1

A composition was prepared, in the manner described, from the following ingredients:

| | Parts by weight |
|---|---|
| Polyvinyl alcohol | 100 |
| Glycerol | 35 |
| Water | 45 |
| Ammonium bromide | 12 |

Molded sheet material made therefrom remained flexible after 10 days exposure to oil at 115°–125° C. and retained its flexibility at —40° C. The material showed no signs of crystallization. Material prepared in the same way from the above ingredients but omitting the ammonium bromide became brittle after 5 days immersion in the hot oil or when cooled to —37° C.

Example 2

A composition prepared from the same amounts of the same ingredients as in Example 1 but with the addition of 6 parts of formamide showed the same beneficial results from the presence of the ammonium bromide, indicating that it is equally effective in a composition containing formamide. Example 1, by comparison, showed that the omission of formamide did not effect the increased resistance to heat and cold produced by the ammonium bromide.

Example 3

To determine that haloids would improve the resistance to heat and cold in polyvinyl alcohol compositions containing substitutes for glycerol the two following formulae were tested:

| | Parts by weight |
|---|---|
| Polyvinyl alcohol | 100 |
| Water | 45 |
| Formamide | 6 |
| Acetamide | 25 |
| Triethanol amine | 10 |
| Ammonium bromide | 10 |

Example 4

| | Parts by weight |
|---|---|
| Polyvinyl alcohol | 100 |
| Water | 45 |
| Formamide | 10 |
| Ethylene glycol | 35 |
| Ammonium bromide | 12 |

As in the case of the materials made in accordance with Examples 1 and 2, containing glycerol, the materials of Examples 4 and 5 remained flexible at —40° C. and after 10 days immersion in hot oil at 115°–125° C.

Instead of ammonium bromide, ammonium chloride may be used, with equally beneficial results, as shown by the following examples:

Examples 5, 6 and 7

| | Parts by weight | | |
|---|---|---|---|
| | Ex. 5 | Ex. 6 | Ex. 7 |
| Polyvinyl alcohol | 100 | 100 | 100 |
| Glycerol | 35 | 35 | 35 |
| Formamide | 6 | 6 | 6 |
| Water | 45 | 45 | 45 |
| Ammonium chloride | 12 | 8 | 4 |
| Monoethanol amine | 6 | 4 | 2 |

It will be noted that in these three compositions the ammonium chloride was used in decreasing amounts. All three compositions possessed very good resistance to low temperatures and remained flexible at —40° C. Their heat resistance decreased with the amount of ammonium chloride used. However, even the smallest amount substantially improved the heat resistance. The monoethanol amine was used to eliminate or reduce the crystallization of the ammonium chloride. Ammonium chloride, in spite of a greater tendency to crystallize, produces results which are, weight for weight, at least equal to those produced by ammonium bromide.

Example 8

In the following formula, ammonium iodide was used successfully:

| | Parts by weight |
|---|---|
| Polyvinyl alcohol | 100 |
| Glycerol | 35 |
| Formamide | 6 |
| Water | 45 |
| Ammonium iodide | 12 |

Example 9

The following formula using alkali metal halides also improved the heat and cold resistance.

| | Parts by weight |
|---|---|
| Polyvinyl alcohol | 100 |
| Glycerol | 35 |
| Formamide | 6 |
| Water | 45 |
| Sodium bromide | 5 |
| Potassium bromide | 5 |

*Example 10*

Alkaline earth metal halides were used in the following:

| | Parts by weight |
|---|---|
| Polyvinyl alcohol | 100 |
| Glycerol | 35 |
| Formamide | 6 |
| Water | 45 |
| Calcium chloride | 5 |
| Calcium bromide | 5 |
| Monoethanol amine | 3 |

Soluble fluorides may be used and produce some improvement in the heat and cold resistance although the results produced thereby are not as pronounced as with the other soluble haloids. As examples of the use of fluorides the following are given:

*Example 11*

| | Parts by weight |
|---|---|
| Polyvinyl alcohol | 100 |
| Glycerol | 35 |
| Formamide | 6 |
| Water | 40 |
| Ammonium bifluoride | 8 |

*Example 12*

| | |
|---|---|
| Polyvinyl alcohol | 100 |
| Glycerol | 35 |
| Formamide | 6 |
| Water | 45 |
| Potassium acid fluoride | 12 |
| Monoethanol amine | 6.2 |

The practical advantages of the present invention are many. Polyvinyl alcohol compositions have varied applications in industry as parts of many kinds of apparatus, equipment and machinery in the form of hose, tubing, gaskets, diaphragms, coatings, packing and the like. Such parts may be used in pumps, valves, hydraulic systems, internal combustion engines, fire extinguishers, various kinds of machinery, etc. In such applications it may be required that the polyvinyl alcohol compositions withstand continued high temperatures, as for example when parts formed from such compositions are part of the lubricating or fuel supply system of an engine. In other applications it may be required that the articles made of such compositions remain flexible at very low temperatures, as for example in automobiles or fire extinguishers used in cold climates where hardening at low temperatures would render inoperative or liable to injury the mechanism of which they form a part. By increasing the duration of flexibility of the compositions at elevated temperatures and by keeping them flexible at lower temperatures than is possible with the usual compositions, their range of usefulness is greatly increased and they are rendered adaptable to various fields in which it has not hitherto been practical to use them.

The invention is not limited to the detailed examples herein given by way of illustration but may be modified in various ways within the purview of the claims.

What is claimed is:

1. A normally flexible plasticized polyvinyl alcohol composition containing as a thermostabilizing agent a substance selected from the group consisting of the soluble haloids of ammonium, of alkali metals and of alkaline earth metals.

2. A normally flexible plasticized polyvinyl alcohol composition containing as a thermostabilizing agent an ammonium haloid.

3. A normally flexible plasticized polyvinyl alcohol composition containing as a thermostabilizing agent ammonium chloride.

4. A normally flexible plasticized polyvinyl alcohol composition containing as a thermostabilizing agent a substance selected from the group consisting of the soluble haloids of ammonium, of alkali metals and of alkaline earth metals, said substance being present in an amount sufficient to increase the duration of flexibility at elevated temperatures.

5. A normally flexible plasticized polyvinyl alcohol composition containing as a thermostabilizing agent a substance selected from the group consisting of the soluble haloids of ammonium, of alkali metals and of alkaline earth metals, and an ethanolamine in such amount as to retard crystallization of the haloid in said composition.

6. A normally flexible plasticized polyvinyl alcohol composition containing as a thermostabilizing agent from about 3% to about 15% of an ammonium haloid, calculated on the amount of polyvinyl alcohol.

7. A normally flexible plasticized polyvinyl alcohol composition containing as a thermostabilizing agent such an amount of a soluble alkali metal haloid as will increase the duration of flexibility at elevated temperatures.

8. A normally flexible plasticized polyvinyl alcohol composition containing as a thermostabilizing agent sodium bromide.

9. A normally flexible plasticized polyvinyl alcohol composition containing as a thermostabilizing agent such an amount of a soluble alkaline earth metal haloid as will increase the duration of flexibility at elevated temperatures.

10. A normally flexible plasticized polyvinyl alcohol composition containing as a thermostabilizing agent calcium chloride.

CHARLES DANGELMAJER.